United States Patent
Xu et al.

(10) Patent No.: US 11,153,778 B2
(45) Date of Patent: Oct. 19, 2021

(54) BUFFER STATUS REPORT REPORTING METHOD AND APPARATUS

(71) Applicant: Huawei Technologies Co., Ltd., Shenzhen (CN)

(72) Inventors: Bin Xu, Beijing (CN); Wei Quan, Beijing (CN); Jian Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 234 days.

(21) Appl. No.: 16/364,545

(22) Filed: Mar. 26, 2019

(65) Prior Publication Data

US 2019/0223048 A1    Jul. 18, 2019

Related U.S. Application Data

(63) Continuation of application No. PCT/CN2017/101510, filed on Sep. 13, 2017.

(30) Foreign Application Priority Data

Sep. 27, 2016   (CN) .................... 201610855265.9

(51) Int. Cl.
  *H04W 4/00* (2018.01)
  *H04W 28/02* (2009.01)
  (Continued)

(52) U.S. Cl.
  CPC ... *H04W 28/0278* (2013.01); *H04W 28/0268* (2013.01); *H04W 28/065* (2013.01);
  (Continued)

(58) Field of Classification Search
  None
  See application file for complete search history.

(56) References Cited

U.S. PATENT DOCUMENTS

2010/0040028 A1   2/2010  Maheshwari et al.
2010/0254321 A1*  10/2010 Kim .................... H04W 72/044
                                                    370/329
(Continued)

FOREIGN PATENT DOCUMENTS

CN    101932019 A    12/2010
CN    102119574 A    7/2011
(Continued)

OTHER PUBLICATIONS

"Buffer Reporting for E-UTRAN," Agenda Item: 6.5, Source: Nokia, Document for: Discussion and Decision, 3GPP TSG-RAN WG2 Meeting #52, R2-060829, XP003013941, Athens, Greece, Mar. 27-31, 2006, 5 pages.

(Continued)

*Primary Examiner* — Bob A Phunkulh
(74) *Attorney, Agent, or Firm* — Slater Matsil, LLP

(57) ABSTRACT

A buffer status report reporting method and apparatus, the method including determining, by a terminal, a first logical channel used to transmit first-type service data, where data processing duration required by the first-type service data is less than a first specified threshold, triggering, by the terminal, a first buffer status report BSR based on the first logical channel when the first-type service data that can be used to be sent exists on the first logical channel, sending the first BSR to a base station, receiving a first uplink resource allocated by the base station to the first logical channel, and sending, by the terminal, the first-type service data by using the first uplink resource.

18 Claims, 7 Drawing Sheets

(51) Int. Cl.
*H04W 72/12* (2009.01)
*H04W 72/10* (2009.01)
*H04W 72/04* (2009.01)
*H04W 28/06* (2009.01)
*H04W 28/12* (2009.01)
*H04W 28/24* (2009.01)
*H04W 72/14* (2009.01)
*H04W 76/10* (2018.01)
*H04W 76/20* (2018.01)

(52) U.S. Cl.
CPC ........... *H04W 28/12* (2013.01); *H04W 28/24* (2013.01); *H04W 72/04* (2013.01); *H04W 72/10* (2013.01); *H04W 72/12* (2013.01); *H04W 72/1242* (2013.01); *H04W 72/1284* (2013.01); *H04W 72/14* (2013.01); *H04W 76/10* (2018.02); *H04W 76/20* (2018.02)

(56) References Cited

U.S. PATENT DOCUMENTS

| | | | |
|---|---|---|---|
| 2012/0099452 A1 | 4/2012 | Dai et al. | |
| 2012/0307770 A1* | 12/2012 | Kubota | H04W 28/0205 370/329 |
| 2013/0028201 A1* | 1/2013 | Koo | H04W 72/1215 370/329 |
| 2015/0289253 A1* | 10/2015 | Pan | H04W 72/0413 370/329 |
| 2015/0327116 A1* | 11/2015 | Zhang | H04W 72/1284 370/329 |
| 2016/0007229 A1 | 1/2016 | Gao et al. | |
| 2016/0044678 A1 | 2/2016 | Kwon | |
| 2016/0227561 A1* | 8/2016 | Susitaival | H04W 28/0278 |
| 2018/0270722 A1* | 9/2018 | Kim | H04W 72/10 |

FOREIGN PATENT DOCUMENTS

| | | |
|---|---|---|
| CN | 104349461 A | 2/2015 |
| CN | 104378825 A | 2/2015 |
| CN | 104521279 A | 4/2015 |
| WO | 2014162003 A1 | 10/2014 |

OTHER PUBLICATIONS

"Uplink Scheduling for NR," Agenda Item: 9.4 2.3, Source: Ericsson, Document for: Discussion, Decision, 3GPP TSG-RAN WG2 #95, Tdoc R2-165341, Gothenburg, Sweden, Aug. 22-26, 2016, 4 pages.

* cited by examiner

BUFFER STATUS REPORT REPORTING METHOD AND APPARATUS

CROSS-REFERENCE TO RELATED APPLICATIONS

This application is a continuation of International Application No. PCT/CN2017/101510, filed on Sep. 13, 2017, which claims priority to Chinese Patent Application No. 201610855265.9, filed on Sep. 27, 2016, the disclosures of the aforementioned applications are hereby incorporated by reference in their entireties.

TECHNICAL FIELD

This application relates to the field of communications technologies, and in particular, to a buffer status report reporting method and apparatus.

BACKGROUND

In a Long Term Evolution (LTE) system, conventional uplink data transmission is based on dynamic scheduling. For an uplink-synchronized terminal in a connected state, if needing to send uplink data, the terminal needs to send an uplink scheduling request (SR) to a base station. The base station sends an uplink scheduling grant (UL-Grant) to allocate an uplink resource to the terminal. However, the SR sent by the terminal to the base station does not carry information about a value of a data volume. Therefore, the terminal sends a buffer status report (BSR) on a corresponding uplink resource. The base station allocates, to the terminal based on information about the BSR, the uplink resource occupied by the data. At last, a user can send the data on the uplink resource.

In an existing BSR reporting mechanism, a total value of data volumes of a plurality of logical channels included in a logical channel group (LCG) is reported on a per-logical-channel-group basis. The base station allocates an uplink resource based on the total value of the data volumes of the LCG. After receiving the uplink resource allocated by the base station, the terminal needs to allocate a resource to each logical channel according to a configuration rule and a token bucket rule that are given by the base station.

Specifically, the base station first allocates a priority and a prioritized bit rate to each logical channel of the terminal by using Radio Resource Control (RRC) signaling. The terminal allocates the resource to each logical channel based on the priority and the PBR of the logical channel. When allocating the resource to data on each logical channel, the terminal first needs to ensure that the allocated resource satisfies a minimum resource requirement (to be specific, the PBR) of each logical channel. After it is ensured that the PBR of each logical channel is satisfied, the resource is allocated to the logical channels in descending order based on priorities of the logical channels. A logical channel having a low priority can be served only when data on all logical channels having a high priority is sent and the allocated resource is not exhausted. FIG. 1 shows an example of resource allocation to logical channels. It may be learned from FIG. 1 that a Media Access Control protocol (MAC) data unit (PDU) sent by the terminal carries PBRs of three logical channels and some data having a high priority.

In fifth generation (5G) communication and a plurality of other types of wireless communications systems, various types of services, for example, an ultra-reliable and low-latency communications (URLLC) service, need to be supported. These services have a higher requirement on a transmission latency of the wireless communications systems. When transmitting a latency-sensitive service, the terminal still performs BSR reporting based on the LCG. Therefore, the base station learns of a data volume of only a logical channel group, and cannot accurately learn of an accurate data volume on a logical channel carrying the type of latency-sensitive service. Consequently, data of the latency-sensitive service may not be sent at a time, resulting in a delay increase. In addition, resource multiplexing needs to be performed between logical channels, causing time consumption in a processing process of the resource multiplexing between the logical channels. For example, the resource is allocated to the logical channels in FIG. 1. The latency-sensitive service has a high priority. Therefore, the service cannot be sent at a time, and resource multiplexing between the logical channels causes an additional delay.

In conclusion, when the BSR reporting is performed based on the LCG, a granularity of resource allocation by the base station is relatively coarse, resulting in a delay increase of service data having a relatively high transmission latency requirement.

SUMMARY

Embodiments of this application provide a buffer status report reporting method and an apparatus, to resolve a problem that a delay of service data having a relatively high transmission latency requirement is increased due to that a granularity of resource allocation by a base station is relatively coarse when BSR reporting is performed based on an LCG.

Specific technical solutions provided in the embodiments of this application are as follows.

According to a first aspect, a BSR reporting method is provided. For a type of service data requiring processing duration less than a specified threshold, a terminal performs BSR reporting based on only a logical channel or a data bearer. In this way, delayed transmission of service data having a high transmission latency requirement in a conventional manner of performing BSR reporting based on a logical channel group can be avoided, and processing duration of the type of service data is shortened to some extent, thereby improving processing efficiency of the type of service data.

In a possible design, the BSR reporting method may be implemented in the following manner, including determining, by the terminal, a first logical channel used to transmit first-type service data, where data processing duration required by the first-type service data is less than a first specified threshold, and triggering, by the terminal, a first buffer status report BSR based on the first logical channel when determining that the first-type service data that can be used to be sent exists on the first logical channel.

In a possible design, the triggering, by the terminal, a first BSR based on the first logical channel may be implemented in the following manner, including determining, by the terminal based on a correspondence between a service type and a basic data unit size, a first basic data unit size corresponding to a service type of the first-type service data, calculating, by the terminal, that a data volume of the first-type service data is N times the first basic data unit size, and adding, by the terminal, a value of N to the first BSR. The correspondence is preset or is indicated by a base station to the terminal. In this way, the terminal adds the value of N to the first BSR instead of adding a range of a value of a data volume of to-be-sent data to a BSR in a conventional manner, to clearly notify the base station of a value of a data volume of to-be-sent data, and help the base station to allocate a precise first uplink resource. In addition, a resource occupied by carrying the value of the multiple N is smaller than that occupied by carrying a value of a data volume of to-be-transmitted data, to avoid an excessive resource occupied by the BSR, so that the precise value of the data volume can be accurately indicated, and the resource can be saved.

In a possible design, the terminal further adds, to the first BSR, first indication information used to indicate the service type of the first-type service data. The first indication information is used by the base station to determine the first basic data unit size. In this way, the base station can conveniently, accurately, and quickly determine the value of the data volume of to-be-transmitted data of the terminal.

In a possible design, after sending the first BSR to the base station, and before receiving information about the first uplink resource allocated by the base station to the first logical channel, the terminal pre-segments a protocol data unit PDU of the first-type service data on a segmentation layer. The segmentation layer is a protocol layer having a data segmentation function, a value of a data volume included in each segment is an integer multiple of the first basic data unit size, and a pre-segmentation function of the terminal may be set to enabled or disabled. When the pre-segmentation function of the terminal is set to enabled, the terminal can perform the pre-segmentation function. In this way, the PDU is pre-segmented, to avoid a higher delay caused by segmentation performed after the uplink resource allocated by the base station is received and shorten a data processing delay of the first-type service data to some extent.

In a possible design, the terminal receives RRC signaling or a MAC CE that is sent by the base station, to determine the pre-segmentation function allocated by the base station to the terminal.

In a possible design, the terminal adds second indication information including a BSR type to the first BSR. The second indication information is used to instruct the base station to allocate the first uplink resource only to the first logical channel.

In a possible design, after the terminal triggers the first BSR based on the first logical channel, if an available uplink resource of the terminal is sufficient to send the first BSR, the terminal sends the first BSR to the base station, or if an available uplink resource of the terminal is 0 or is insufficient to send the first BSR, the terminal sends the first BSR to the base station after triggering reporting of a scheduling request SR. The SR is used to request, from the base station, an uplink resource used to send the first BSR, and the reporting of the SR is not limited by a logical channel SR-prohibit timer. In this way, the data processing delay of the first-type service data can be further shortened.

In a possible design, after sending the first BSR to the base station, the terminal triggers a periodic BSR based on a specified period and sends the periodic BSR to the base station. The periodic BSR is periodically triggered by using the first-type service data. In this way, the base station can learn of data sending of the terminal in time, and allocate the uplink resource to the terminal in time, to avoid a subsequent problem of insufficiency of a resource available to data when the terminal periodically sends data.

In a possible design, after sending the first BSR to the base station, the terminal receives, in specified duration, the first uplink resource allocated by the base station to the first logical channel, and sends the first-type service data by using the first uplink resource. Alternatively, if not receiving the first uplink resource in specified duration, the terminal resends the first BSR to the base station. A problem that sending of the first-type service data is delayed due to that the terminal cannot receive the uplink resource when the terminal fails to send the first BSR to the base station or the base station fails to send the first uplink resource to the terminal is avoided, to ensure arrival of the resource for the first-type service data.

In a possible design, before sending the first BSR to the base station, the terminal may send a second BSR to the base station. The second BSR is used to indicate a value of a data volume of second-type service data to be sent by the terminal, data processing duration required by the second-type service data is greater than a second specified threshold, and the second specified threshold is greater than or equal to the first specified threshold. In addition, the terminal receives a second uplink resource allocated by the base station based on the second BSR to a logical channel group including at least two second logical channels. The second logical channel is used to transmit the second-type service data, and a size of the second uplink resource is not less than the value of the data volume of the first-type service data to be sent. In this case, the terminal sends the first-type service data by using the second uplink resource, thereby ensuring that the first-type service data is sent in time.

In a possible design, if not successfully sending the first BSR when receiving the second uplink resource, the terminal cancels sending the first BSR.

In a possible design, if successfully sending the first BSR when receiving the second uplink resource, the terminal sends the second-type service data by using the first uplink resource when receiving the first uplink resource.

In a possible design, a descending sequence of transmission priorities of the first BSR, the second BSR, the first-type service data, and the second-type service data is the first BSR, the first-type service data, the second BSR, and the second-type service data.

According to a second aspect, a buffer status report reporting method is provided. A base station allocates, to a terminal, a logical channel specifically used to transmit a type of service data requiring processing duration less than a specified threshold, and configures that when there is the type of data to be sent by the terminal, the terminal can trigger BSR reporting based on only the logical channel. In this way, delayed transmission of service data having a high transmission latency requirement in a conventional manner of performing BSR reporting based on a logical channel group can be avoided, and processing duration of the type of service data is shortened to some extent, thereby improving processing efficiency of the type of service data.

In a possible design, the BSR reporting method may be implemented in the following manner, including allocating, by the base station to the terminal, a first logical channel used to transmit first-type service data, and notifying the terminal of the first logical channel, where data processing duration required by the first-type service data is less than a first specified threshold, and receiving, by the base station, a first buffer status report BSR sent by the terminal.

In a possible design, after receiving the first BSR sent by the terminal, the base station allocates a first uplink resource to the first logical channel, and sends the first uplink resource to the terminal. The base station receives, on the first uplink resource, the first-type service data sent by the terminal.

In a possible design, the allocating, by the base station, a first uplink resource to the first logical channel may be implemented in the following manner, including determining, by the base station, a service type of the first-type service data according to first indication information carried in the first BSR, determining, based on a correspondence between a service type and a basic data unit size, a first basic data unit size corresponding to the service type of the first-type service data, and calculating a size of the first uplink resource based on a value of N carried in the first BSR and the determined first basic data unit size, and allocating the first uplink resource to the first logical channel. A data volume of the first-type service data is N times the first basic data unit size. In this way, the base station can accurately learn of, based on the value of N, a value of a to-be-sent data volume of the terminal, and precisely allocate the size of the uplink resource to the terminal.

In a possible design, the base station and the terminal preset the correspondence between the service type and the basic data unit size. Alternatively, the base station determines, based on a parameter, a basic data unit size corresponding to each service type, and indicates the correspondence between the service type and the basic data unit size to the terminal. The parameter includes radio link quality, system load, and a service type feature. In this way, an appropriate correspondence between service types and basic data unit sizes can be indicated to the terminal with reference to the link quality.

In a possible design, the base station indicates the correspondence to the terminal by using Radio Resource Control RRC signaling, a Media Access Control control element MAC CE, or a physical downlink control channel PDCCH order.

In a possible design, the base station may configure, for the terminal by using RRC signaling, a parameter of the first logical channel used to transmit the first-type service data.

In a possible design, the base station may further configure a pre-segmentation function for the terminal. The pre-segmentation function may be set to enabled or disabled. An example of an implementation is before the receiving, by the base station, a first BSR sent by the terminal, setting, by the base station, the pre-segmentation function of the terminal to enabled, and instructing the terminal to pre-segment, after sending the first BSR and before receiving the first uplink resource, a protocol data unit PDU of the first-type service data on a segmentation layer. A value of a data volume included in each segment is an integer multiple of the first basic data unit size, and the segmentation layer is a protocol layer having a data segmentation function.

In a possible design, the base station notifies the terminal of the pre-segmentation function by using RRC signaling or a MAC CE.

In a possible design, granularities of configuring the pre-segmentation function by the base station are different. The base station may configure the pre-segmentation function based on the logical channel or a radio bearer of the terminal. Alternatively, the base station may configure the pre-segmentation function based on the terminal.

According to a third aspect, a buffer status report reporting apparatus is provided. The apparatus has a function of implementing behavior of the terminal according to the first aspect or any possible design of the first aspect. The function may be implemented by hardware, or may be implemented by hardware executing corresponding software. The hardware or software includes one or more modules corresponding to the foregoing functions.

According to a fourth aspect, a buffer status report reporting apparatus is provided. The apparatus has a function of implementing behavior of the base station according to the second aspect or any possible design of the second aspect. The function may be implemented by hardware, or may be implemented by hardware executing corresponding software. The hardware or software includes one or more modules corresponding to the foregoing functions.

According to a fifth aspect, a terminal is provided. A structure of the terminal includes a transceiver, a memory, and a processor. The memory is configured to store a group of programs. The processor is configured to invoke the programs stored in the memory to perform the method according to the first aspect or any possible design of the first aspect.

In a possible design, the processor is configured to determine a first logical channel used to transmit first-type service data, where data processing duration required by the first-type service data is less than a first specified threshold, and trigger a first buffer status report BSR based on the first logical channel when determining that the first-type service data that can be used to be sent exists on the first logical channel. In this way, delayed transmission of service data having a high transmission latency requirement in a conventional manner of performing BSR reporting based on a logical channel group can be avoided, and processing duration of the type of service data is shortened to some extent, thereby improving processing efficiency of the type of service data.

In a possible design, the processor is configured to determine, based on a correspondence between a service type and a basic data unit size, a first basic data unit size corresponding to a service type of the first-type service data, where the correspondence is preset or is indicated by a base station to the terminal, determine that a data volume of the first-type service data is N times the first basic data unit size, and add a value of N to the first BSR. In this way, the terminal adds the value of N to the first BSR instead of adding a range of a value of a data volume of to-be-sent data to a BSR in a conventional manner, to clearly notify the base station of the value of the data volume of the to-be-sent data, and help the base station to allocate a precise first uplink resource. In addition, a resource occupied by carrying the value of the multiple N is smaller than that occupied by carrying a value of a data volume of to-be-transmitted data, to avoid an excessive resource occupied by the BSR, so that the precise value of the data volume can be accurately indicated, and the resource can be saved.

In a possible design, the processor is further configured to add, to the first BSR, first indication information used to indicate the service type of the first-type service data. The first indication information is used by the base station to determine the first basic data unit size. In this way, the base station can conveniently, accurately, and quickly determine the value of the data volume of to-be-transmitted data of the terminal.

In a possible design, the processor is further configured to pre-segment a protocol data unit PDU of the first-type service data on a segmentation layer after triggering the first BSR. A value of a data volume included in each segment is an integer multiple of the first basic data unit size, the segmentation layer is a protocol layer having a data segmentation function, and a pre-segmentation function of the terminal may be set to enabled or disabled. When the pre-segmentation function is set to enabled, the terminal can perform the pre-segmentation function. In this way, the PDU is pre-segmented, to avoid a higher delay caused by segmentation performed after the uplink resource allocated by the base station is received and shorten a data processing delay of the first-type service data to some extent.

In a possible design, the processor is further configured to receive RRC signaling or a MAC CE that is sent by the base station, to determine the pre-segmentation function allocated by the base station to the terminal.

In a possible design, the processor is further configured to add second indication information including a BSR type to the first BSR. The second indication information is used to instruct the base station to allocate the first uplink resource only to the first logical channel.

In a possible design, the processor is further configured to, after triggering the first BSR based on the first logical channel, if an available uplink resource is sufficient to send the first BSR, send the first BSR to the base station by using the transceiver, or if an available uplink resource is insufficient to send the first BSR, send the first BSR to the base station by using the transceiver after triggering reporting of a scheduling request SR. The SR is used to request, from the base station, an uplink resource used to send the first BSR, and the reporting of the SR is not limited by a logical channel SR-prohibit timer. In this way, the data processing delay of the first-type service data can be further shortened.

In a possible design, the processor is further configured to, after sending the first BSR to the base station by using the transceiver, trigger a periodic BSR based on a specified period and send the periodic BSR to the base station by using the transceiver. The periodic BSR is periodically triggered by using the first-type service data. In this way, the base station can learn of data sending of the terminal in time, and allocate the uplink resource to the terminal in time, to avoid a subsequent problem of insufficiency of a resource available to data when the terminal periodically sends data.

In a possible design, the processor is further configured to, after the transceiver sends the first BSR to the base station, receive, in specified duration by using the transceiver, the first uplink resource allocated by the base station to the first logical channel. The processor is further configured to send the first-type service data by using the first uplink resource and the transceiver, or resend the first BSR to the base station by using the transceiver if the transceiver does not receive the first uplink resource in specified duration. A problem that sending of the first-type service data is delayed due to that the terminal cannot receive the uplink resource when the terminal fails to send the first BSR to the base station or the base station fails to send the first uplink resource to the terminal is avoided, to ensure arrival of the resource for the first-type service data.

In a possible design, the processor is further configured to send a second BSR to the base station by using the transceiver before sending the first BSR to the base station by using the transceiver. The second BSR is used to indicate a value of a data volume of second-type service data to be sent, data processing duration required by the second-type service data is greater than a second specified threshold, and the second specified threshold is greater than or equal to the first specified threshold. The processor is further configured to receive, by using the transceiver, a second uplink resource allocated by the base station based on the second BSR to a logical channel group including at least two second logical channels. The second logical channel is used to transmit the second-type service data, and a size of the second uplink resource is not less than the value of the data volume of the first-type service data to be sent. The processor is further configured to send the first-type service data by using the second uplink resource and the transceiver, thereby ensuring that the first-type service data is sent in time.

In a possible design, the processor is further configured to send the second-type service data by using the first uplink resource and the transceiver.

In a possible design, a descending sequence of transmission priorities of the first BSR, the second BSR, the first-type service data, and the second-type service data is, the first BSR, the first-type service data, the second BSR, and the second-type service data.

According to a sixth aspect, a base station is provided. A structure of the base station includes a transceiver, a memory, and a processor. The memory is configured to store a group of programs. The processor is configured to invoke the programs stored in the memory to perform the method according to the second aspect or any possible design of the second aspect.

In a possible design, the processor is configured to allocate, to a terminal, a first logical channel used to transmit first-type service data, notify the terminal of the first logical channel allocated by using the transceiver, where data processing duration required by the first-type service data is less than a first specified threshold, and after notifying the terminal of the first logical channel by using the transceiver, receive a first buffer status report BSR sent by the terminal. In this way, delayed transmission of service data having a high transmission latency requirement in a conventional manner of performing BSR reporting based on a logical channel group can be avoided, and processing duration of the type of service data is shortened to some extent, thereby improving processing efficiency of the type of service data.

In a possible design, the processor is further configured to allocate a first uplink resource to the first logical channel, send the first uplink resource to the terminal by using the transceiver, and receive, on the first uplink resource, the first-type service data sent by the terminal.

In a possible design, the processor is configured to determine a service type of the first-type service data according to first indication information carried in the first BSR, determine, based on a correspondence between a service type and a basic data unit size, a first basic data unit size corresponding to the service type of the first-type service data, and calculate a size of the first uplink resource based on a value of N carried in the first BSR and the determined first basic data unit size, and allocate the first uplink resource to the first logical channel. A data volume of the first-type service data is N times the first basic data unit size. In this way, the base station can accurately learn of, based on the value of N, a value of a to-be-sent data volume of the terminal, and precisely allocate the size of the uplink resource to the terminal.

In a possible design, the correspondence between the service type and the basic data unit size is preset. Alternatively, the processor is further configured to determine, based on a parameter, a basic data unit size corresponding to each service type, where the parameter includes radio link quality, system load, and a service type feature, and indicate the correspondence between the service type and the basic data unit size to the terminal. In this way, an appropriate correspondence between service types and basic data unit sizes can be indicated to the terminal with reference to the link quality.

In a possible design, the processor indicates the correspondence to the terminal by using the transceiver and Radio Resource Control (RRC) signaling, a Media Access Control control element (MAC CE), or a physical downlink control channel (PDCCH) order.

In a possible design, the processor is further configured to configure, for the terminal by using RRC signaling, a parameter of the first logical channel used to transmit the first-type service data.

In a possible design, the processor is further configured to, before the transceiver receives the first BSR sent by the terminal, configure a pre-segmentation function of the terminal to be enabled, and instruct the terminal to pre-segment, after sending the first BSR and before receiving the first uplink resource, a protocol data unit PDU of the first-type service data on a segmentation layer. A value of a data volume included in each segment is an integer multiple of the first basic data unit size, and the segmentation layer is a protocol layer having a data segmentation function.

In a possible design, the processor is specifically configured to notify the terminal of the pre-segmentation function by using RRC signaling or a MAC CE.

In a possible design, granularities of configuring the pre-segmentation function by the processor are different. The processor may configure the pre-segmentation function based on the logical channel or a radio bearer of the terminal. Alternatively, the processor may configure the pre-segmentation function based on the terminal.

According to a seventh aspect, a computer storage medium is provided. The computer storage medium is configured to store a computer software instruction used by the terminal according to the foregoing aspect, and the computer software instruction includes a program configured to execute the foregoing aspect.

According to an eighth aspect, a computer storage medium is provided. The computer storage medium is configured to store a computer software instruction used by the base station according to the foregoing aspect, and the computer software instruction includes a program designed to execute the foregoing aspect.

DETAILED DESCRIPTION OF ILLUSTRATIVE EMBODIMENTS

To make the objectives, technical solutions, and advantages of this application clearer, the following further describes this application in detail with reference to the accompanying drawings. Apparently, the described embodiments are merely some rather than all of the embodiments of this application. All other embodiments obtained by persons of ordinary skill in the art based on the embodiments of this application without creative efforts shall fall within the protection scope of this application.

In view of a problem in the prior art that a delay of service data having a relatively high transmission latency requirement is increased due to that a granularity of resource allocation by a base station is relatively coarse when BSR reporting is performed based on an LCG, in the embodiments of this application, BSR reporting is performed based on only a logical channel or a data bearer for a type of service data having a relatively high transmission latency requirement, to shorten processing duration of the type of service data to some extent, thereby improving processing efficiency of the type of service data.

Figure 1:
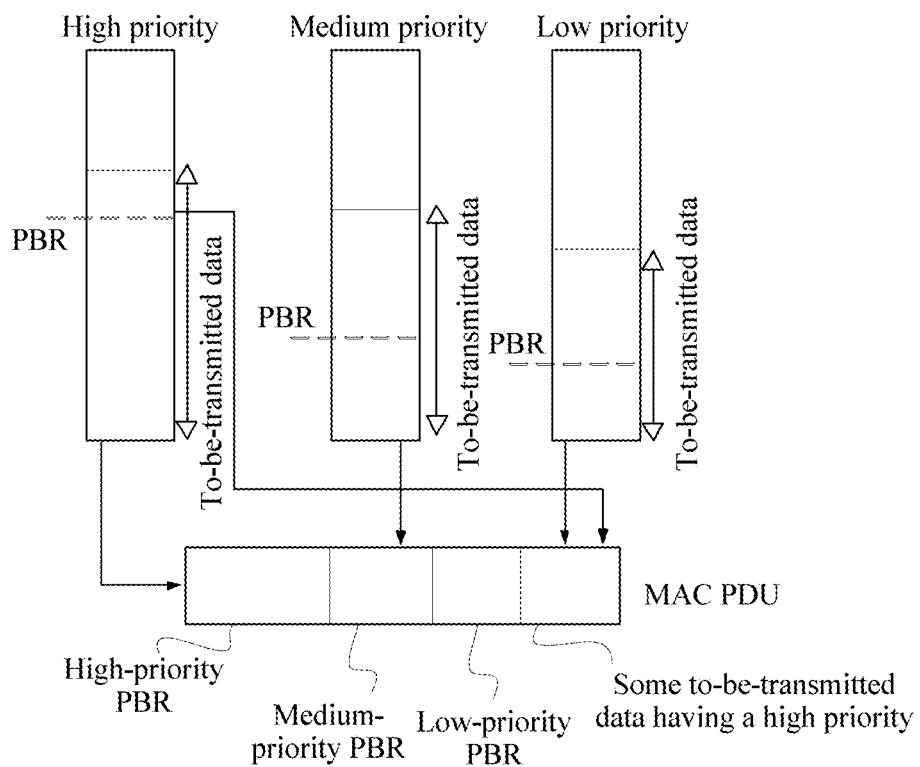
FIG. 1 is a schematic diagram of resource allocation to logical channels in the prior art.
Figure 2:
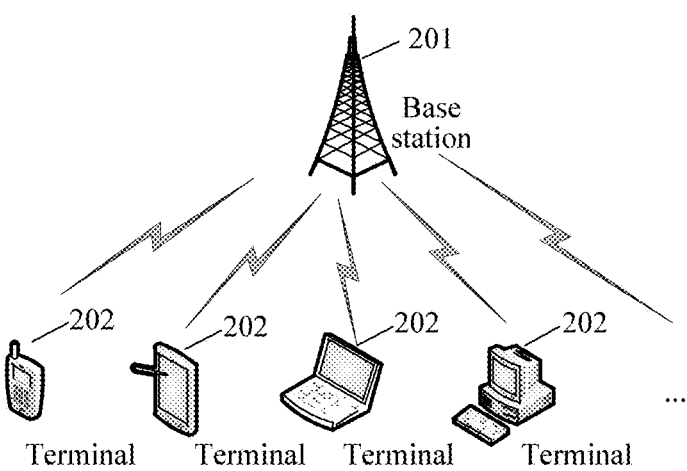
FIG. 2 is a schematic diagram of an applied system architecture according to an embodiment of this application.

As shown in FIG. 2, a system architecture applied to the embodiments of this application includes a base station 201 and a terminal 202. The base station 201 is an apparatus deployed in a radio access network to provide a wireless communication function for a terminal device. The base station device may include a macro base station, a micro base station, a relay station, an access point, and the like in various forms, and may be applied to systems of different radio access technologies, for example, to more possible communications systems such as a Long Term Evolution (LTE) system or a $5^{th}$-generation (5G) communications system. The terminal 202 may include various handheld devices, in-vehicle devices, wearable devices, and computing devices having a wireless communication function or another processing device connected to a wireless modem, and user equipment (UE), a mobile station (MS), a terminal device, and the like in various forms.

A BSR reporting method and apparatus provided in the embodiments of this application are described in detail below with reference to the accompanying drawings.

It should be noted that in the following descriptions of the embodiments of this application, first-type service data is data of a service having a very high transmission latency requirement. For example, an ultra-reliable and low-latency communications (URLLC) service is a relatively representative service having a very high transmission latency requirement. A logical channel is a virtual channel defined between a Radio Link Control (RLC) layer and a MAC layer. Different logical channels are used to transmit different types of data. The logical channel in the embodiments of this application is used as a part of a radio bearer, to be specific, a radio bearer may include one or more logical channels. The radio bearer may be classified into a data bearer and a signaling bearer. Compared with the first-type service data, second-type service data is data of a service having a relatively low transmission latency requirement. BSR reporting may be performed for the second-type service data based on an LCG in the prior art.

Figure 3:
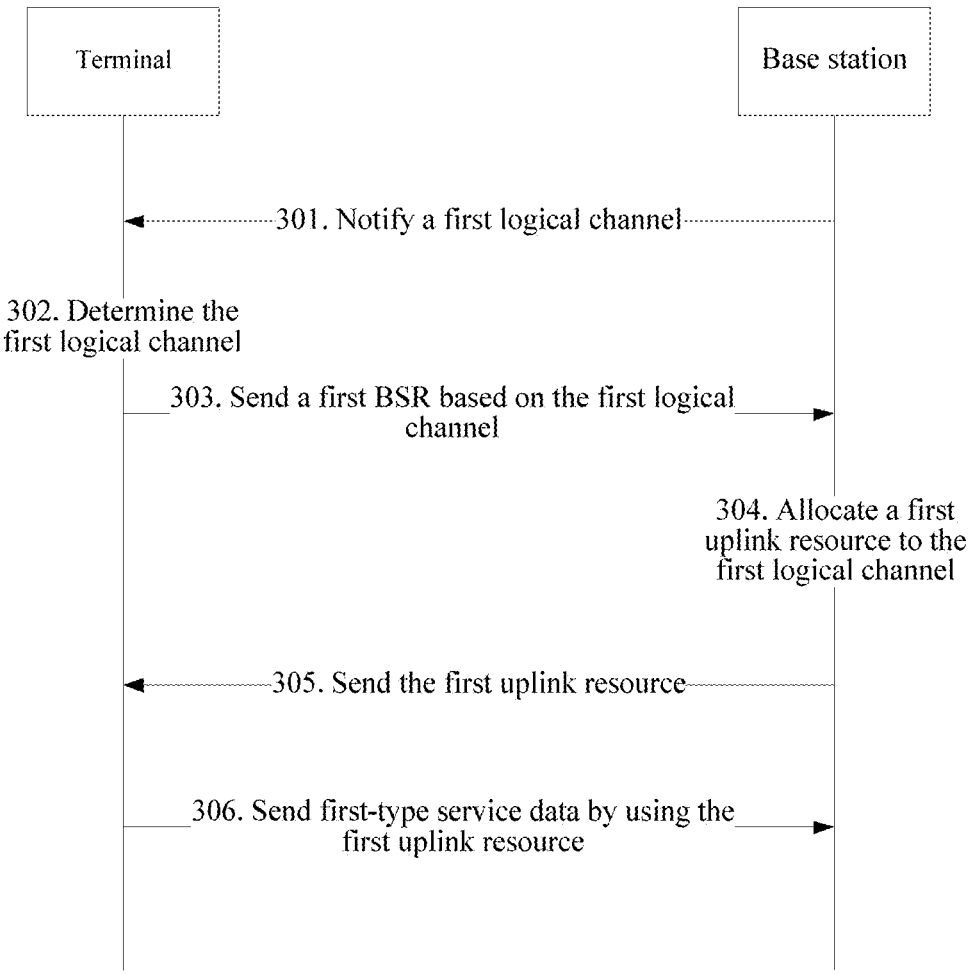
FIG. 3 is a flowchart of a BSR reporting method according to an embodiment of this application.

Referring to FIG. 3, a procedure of the BSR reporting method in an embodiment of this application is described as follows.

Step 301: A base station notifies a terminal of a first logical channel used to transmit a first-type service data.

Data processing duration required by the first-type service data is less than a first specified threshold.

Specifically, the base station may configure, for the terminal in a logical channel configuration information element (Logical Channel Config IE), the first logical channel used to transmit the first-type service data. Certainly, there may be a plurality of first logical channels. If the base station configures a plurality of first logical channels for the terminal. Optionally, the base station further configures priorities for the first logical channels allocated to the terminal. Further, the base station may configure whether each first logical channel can individually trigger indication information for BSR reporting. Usually, each first logical channel can individually trigger the BSR reporting. The base station may notify the terminal of the foregoing configuration information by using RRC signaling.

Step 302: The terminal determines the first logical channel used to transmit the first-type service data.

Specifically, after receiving the RRC signaling, the terminal parses the RRC signaling to obtain information about the first logical channel.

Step 303: When determining that the first-type service data that can be used to be sent exists on the first logical channel, the terminal triggers a first BSR based on the first logical channel, and sends the first BSR to the base station. The base station receives the first BSR sent by the terminal.

Specifically, a type of the first-type service data that can be used to be sent includes an RLC data PDU, an RLC service data unit (SDU) not included in an RLC data PDU, a status PDU, a Packet Data Convergence Protocol (PDCP) SDU, a PDCP PDU, a PDCP control PDU.

Once needing to send new first-type service data, the terminal immediately triggers BSR reporting based on only the first logical channel and does not perform BSR reporting based on a conventional LCG. Alternatively, after BSR reporting is performed based on only a first logical channel, if first-type service data having a higher priority arrives on the first logical channel, BSR reporting is triggered based on only the first logical channel.

In this case, if the terminal has no available uplink resource or an available uplink resource is insufficient to send the first BSR, the terminal immediately triggers reporting of a scheduling request (SR). The reporting of the SR is not limited by a logical channel SR-prohibit timer.

A conventional BSR reported based on the LCG carries indication information corresponding to a range of a value of a data volume. The base station allocates an approximate resource size to the terminal according to the indication information. In this embodiment of this application, reporting content of the first BSR is designed to report a precise volume of required data, so that the base station can allocate a precise uplink resource size to the first-type service data to be sent by the terminal. In this way, a waste of an allocated resource or insufficiency of an allocated resource can also be avoided, so that the resource can be properly used.

A specific manner of triggering the first BSR by the terminal is determining, by the terminal based on a correspondence between a service type and a basic data unit size, a first basic data unit size corresponding to a service type of the first-type service data, determining that a data volume of the first-type service data is N times the first basic data unit size, and adding a value of N to the first BSR.

The correspondence is preset or is indicated by the base station to the terminal. If the correspondence is indicated by the base station to the terminal, specifically, the terminal determines, based on some determining parameters, a basic data unit size corresponding to each service type, and indicates the correspondence between the service type and the basic data unit size to the terminal. These determining parameters include radio link quality, system load, and a service type feature. For example, when the radio link quality is relatively good, the basic data unit size corresponding to the service type may be correspondingly increased. When the radio link quality is relatively poor, the basic data unit size corresponding to the service type may be correspondingly decreased. The base station may indicate the correspondence between the service type and the basic data unit size to the terminal by using RRC signaling, a Media Access Control MAC control element (CE), or a physical downlink control channel (PDCCH) order.

Optionally, the terminal further adds, to the first BSR, first indication information used to indicate the service type of the first-type service data, so that the base station determines the service type of the first-type service data according to the first indication information.

Optionally, the terminal further adds second indication information including a BSR type to the first BSR. The BSR type included in the second indication information is used to inform the base station that an uplink resource needs to be allocated only to the first logical channel.

Step 304: The base station allocates a first uplink resource to the first logical channel after receiving the first BSR sent by the terminal.

Optionally, the base station may learn of the value of N and the service type of the first-type service data from the first BSR.

The base station determines the service type of the first-type service data according to the first indication information carried in the first BSR, determines, based on the correspondence between the service type and the basic data unit size, the first basic data unit size corresponding to the service type of the first-type service data, and calculates a size of the first uplink resource based on the value of N carried in the first BSR and the determined first basic data unit size. The size of the first uplink resource cannot be less than a product of N and the first basic data unit size. Preferably, the size of the first uplink resource is equal to the product of N and the first basic data unit size. In this way, the resource can be precisely allocated. After calculating the size of the first uplink resource, the base station allocates, to the first logical channel, the first uplink resource whose size is the product. Optionally, the base station may allocate the uplink resource to the terminal based on a radio bearer.

Step 305: The base station sends the first uplink resource to the terminal. The terminal receives the first uplink resource sent by the base station.

Step 306: The terminal sends, by using the first uplink resource, the first-type service data to be sent. The base station receives, on the first uplink resource, the first-type service data sent by the terminal.

Optionally, after the terminal sends the first BSR to the base station in step 303 and before the terminal receives information about the first uplink resource allocated by the base station to the first logical channel in step 304, the terminal performs a pre-segmentation process. This design is to avoid a delay caused by segmentation performed after the uplink resource allocated by the base station is received. Pre-segmentation means pre-segmenting a PDU of the first-type service data on a segmentation layer. A value of a data volume included in each segment is an integer multiple of the first basic data unit size. It should be noted that the segmentation layer is a protocol layer having a function of segmenting user data and control data. For example, the segmentation layer may be an RLC layer or a protocol layer having a function similar to that of the RLC layer. Further, a pre-segmentation function of the terminal is configurable, to be specific, may be set to enabled or disabled. The pre-segmentation function of the terminal is configured by the base station. A configuration manner may be notifying the terminal of the pre-segmentation function by using RRC signaling or a MAC CE. A configuration granularity may be configuration for a single terminal or configuration for a single radio bearer or logical channel in the terminal.

According to a characteristic of the first-type service data, the terminal may periodically generate the first-type service data. To be specific, a segment of data needs to be sent at intervals of a time t. To enable the terminal to continuously request the uplink resource when sending the first-type service data and to prevent periodical sending of data from being obstructed due to resource insufficiency, after sending the first BSR to the base station, the terminal continues to trigger a periodic BSR based on a specified period and send the periodic BSR to the base station. The periodic BSR is periodically triggered by using the first-type service data.

In another possible case, after sending the first BSR, the terminal may not receive the first uplink resource allocated by the base station due to factors such as a sending failure or an allocation failure of the first uplink resource by the base station. In this case, sending of the first-type service data by the terminal is also obstructed. To resolve this problem, after sending the first BSR, if not receiving the first uplink resource in specified duration, the terminal re-triggers the first BSR based on the first logical channel and resends the first BSR to the base station, to be specific, performs BSR retransmission.

To further shorten a delay of sending first first-type service data by the terminal, the following optimized solution is further designed in this embodiment of this application.

If receiving, when not successfully sending the first BSR, a second uplink resource allocated by the base station to a logical channel group, and determining that a size of the second uplink resource is not less than the value of the data volume of the first-type service data to be sent, the terminal may cancel sending the first BSR, and send the first-type service data by using the second uplink resource. That the terminal does not successfully send the first BSR includes a case in which the terminal has started to trigger the first BSR. The logical channel group includes at least two second logical channels. The second logical channel is used to transmit a second-type service data. Data processing duration required by the second-type service data is greater than second specified threshold, and the second specified threshold is greater than or equal to the first specified threshold.

If receiving, when the terminal has sent the first BSR but does not receive the first uplink resource allocated by the base station, a second uplink resource allocated by the base station to a logical channel group, and determining that a size of the second uplink resource is not less than the value of the data volume of the first-type service data to be sent, the terminal sends the first-type service data by using the second uplink resource and send the second-type service data by using the first uplink resource when the first uplink resource is allocated.

Further, in this embodiment of this application, to further shorten a processing delay of the first-type service data, when the terminal needs to send the first BSR, the second BSR, the first-type service data, and the second-type service data, a descending sequence of transmission priorities of the several types of data is the first BSR, the first-type service data, the second BSR, and the second-type service data.

A BSR format, BSR content, and the BSR reporting method in this embodiment of this application are further described in detail below with reference to specific application scenarios.

An idea of this embodiment of this application is, when service data having a relatively high latency requirement needs to be sent, BSR reporting needs to be performed only for a logical channel or a data bearer. For ease of description, a type of service for which BSR reporting needs to be performed only for a logical channel is referred to as a logical channel based (LCB) service. The LCB service has a relatively high latency requirement, and may be, for example, a URLLC service or another service having a high latency requirement. For the LCB service, a BSR reported based on a logical channel or a data barer is introduced and may be referred to as an LCB BSR. Correspondingly, another service different from the LCB service may be referred to as a common service. Compared with the LCB service, the common service has a lower latency requirement. For the common service, BSR reporting is still performed based on the LCG, and a BSR reported based on the LCG may be referred to as a common BSR.

1. The Base Station Configures a Logical Channel for the Terminal.

The base station may configure, for the terminal by using RRC signaling, a logical channel used to transmit LCB service data. Optionally, the base station may configure, for the terminal based on a service type of an LCB service, a plurality of logical channels used to transmit the LCB service data. In this case, the base station may further configure priorities for the plurality of logical channels used to transmit the LCB service data.

2. Priorities of Data Sent by the Terminal

A descending sequence of the priorities of the data sent by the terminal is the LCB BSR>the LCB service data>the common BSR>common service data.

If LCB service data based on different logical channels is to be sent, an LCB BSR on a logical channel having a higher priority is first reported based on priorities of the logical channels.

3. Reporting Format of the LCB BSR

When there is common service data to be sent, a format of a common BSR reported by the terminal based on an LCG includes a long BSR, a short BSR, or a truncated BSR.

Figure 4:
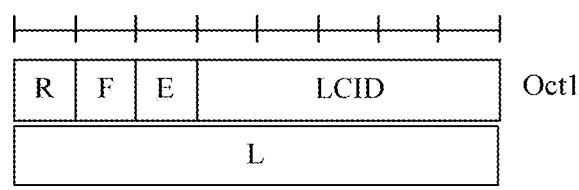
FIG. 4 is a schematic diagram of a sub-header format of an LCB BSR MAC CE according to an embodiment of this application.

The format of the LCB BSR may be a header format of an LCB BSR MAC CE is shown in FIG. 4. R is a reserved bit and is used to indicate a logical channel based on which the LCB BSR is reported. F indicates a length of an L domain. The L domain indicates a size of a MAC CE. E is an extended domain and indicates whether there are more sub-headers in a MAC header. The L domain is optional, and the size of the MAC CE that is indicated by the L domain is also optional. If the MAC CE has a fixed size, the L domain does not need to indicate the size of the MAC CE and may not exist. If the MAC CE has a variable size, the L domain is required to indicate the size of the MAC CE.

An LCID domain may be used to indicate a BSR type. As shown in Table 1, different index values may be used to indicate different LCIDs, to be specific, may represent different BSR types. A value is selected from reserved index values to be an LCID of the LCB BSR. For example, 10101 may be selected. When the LCID=10101, the MAC CE is an LCB BSR MAC CE.

| Index | LCID |
|---|---|
| . . . | . . . |
| 10101 | LCB BSR |
| 11100 | Truncated BSR |
| 11101 | Short BSR |
| 11110 | Long BSR |
| . . . | . . . |

Figure 5:
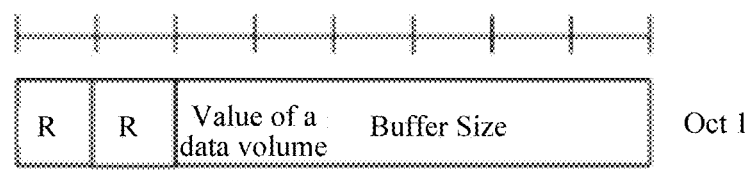
FIG. 5 is a schematic diagram of a format of an LCB BSR MAC CE according to an embodiment of this application.

A format of the LCB BSR MAC CE is shown in FIG. 5. Two R bits may be used to indicate an identifier of a logical channel carrying an LCB service or may be used as reserved bits that are reserved for subsequent use.

Figure 6:
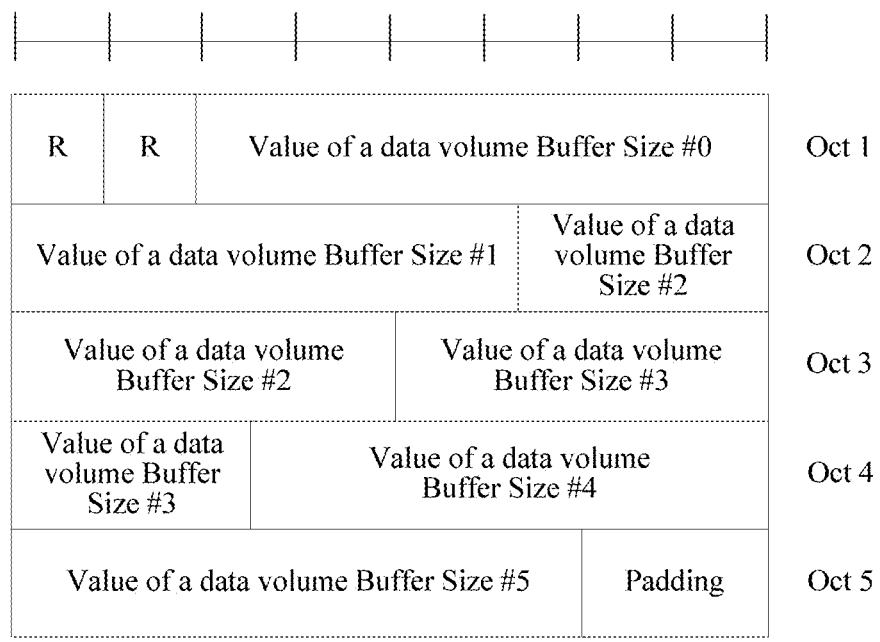
FIG. 6 and FIG. 7 are schematic diagrams of a format of a long BSR MAC CE according to an embodiment of this application.
Figure 7:
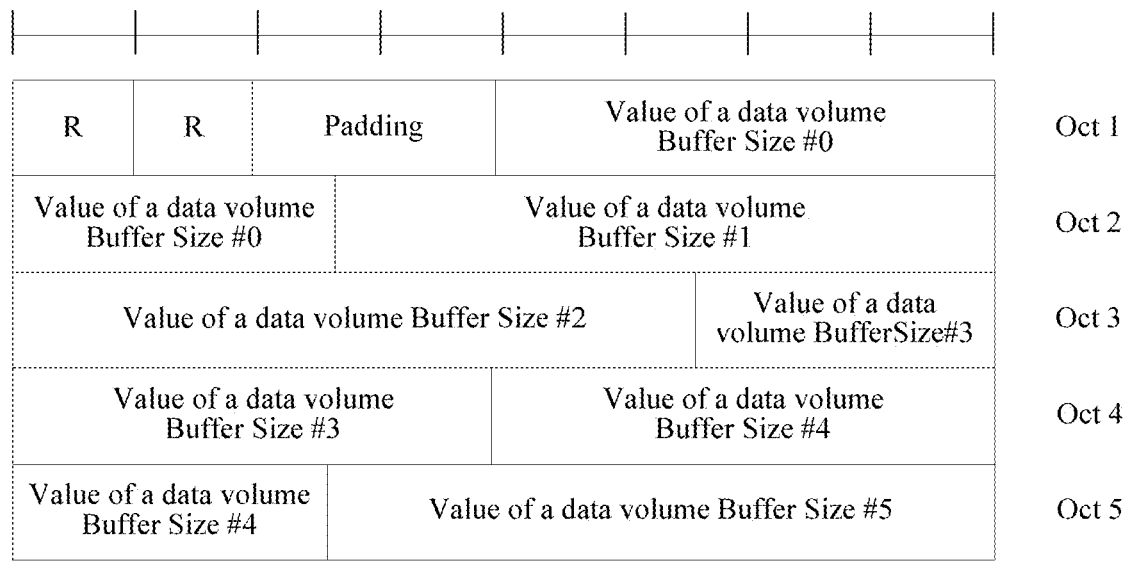

Optionally, another BSR MAC CE format may implement joint reporting of the LCB BSR and the common BSR in a same long BSR MAC CE. For example, specifically, a possible example of a format of the long BSR MAC CE is shown in FIG. 6. An R domain may be used to indicate whether the long BSR MAC CE includes an LCB BSR. Further, the R domain may indicate a quantity of logical channels whose LCB BSRs are included. Alternatively, the R domain may be used as a reserved bit that is reserved for subsequent use. A Buffer Size domain is used to indicate a value of a data volume of to-be-transmitted data. Buffer Size #0, Buffer Size #1, Buffer Size #2, and Buffer Size #3 represent values of data volumes of data in different logical channel groups. Buffer Size #4 and Buffer Size #5 indicate values of data volumes of LCB service data transmitted on two different logical channels individually triggering BSR reporting. Oct1 to Oct5 all include eight bits, and each Buffer Size domain occupies six bits. Padding is a padding data packet. For another example, another possible example of the format of the long BSR MAC CE is shown in FIG. 7. Padding shown in FIG. 6 is placed subsequent to the R domain. Certainly, the formats shown in FIG. 6 or FIG. 7 are merely used as possible examples. A specific quantity of included Buffer Size domains is not limited, and may be increased or decreased with reference to the formats.

4. Reporting Content of the LCB BSR

A Buffer Size domain of a conventional BSR MAC CE includes one index value. The index value corresponds to a buffer size range instead of a precise buffer size, and indicates an "approximate" uplink data volume. The base station cannot accurately determine a value of a data volume of to-be-transmitted data.

To enable the value of a data volume of to-be-transmitted data to be accurately reported by using the LCB BSR, a basic data unit may be defined based on a service feature of an LCB service. Preferably, it may be ensured that all data packets in the LCB service are all an integer multiple of a size of the basic data unit. Different basic data unit sizes are defined for different service types. Preferably, a correspondence between a service type and a basic data unit size may be generated. The terminal may negotiate the correspondence with the base station in advance. Alternatively, the base station determines, based on features such as a radio link case, system load, and a service feature, a basic data unit size corresponding to each service type, generates the correspondence, and indicates the correspondence to the terminal. Specifically, the correspondence may be indicated in a manner such as using RRC signaling, a MAC CE, or a PDCCH order.

When there is LCB service data to be sent, the terminal triggers reporting of an LCB BSR based on an individual logical channel or data bearer. An R domain of the LCB BSR indicates a service type of the LCB service, and a Buffer Size domain carries an integer value. The integer value indicates a multiple by which a data volume of to-be-transmitted data is greater than the basic data unit size.

, and accurately determine, based on the integer value in the Buffer Size domain and the basic data unit size of the service, a value of the data volume of to-be-transmitted data.

In a manner of using the reporting content of the LCB BSR, the base station can accurately learn of the value of the data volume of to-be-transmitted data of the terminal, to implement precise allocation and avoid a resource waste.

5. The Terminal Pre-Segments a Data Packet after the LCB BSR is Reported.

In the prior art, the terminal first obtains, through BSR reporting, an UL grant for an uplink resource allocated by the base station to a logical channel group, and then determines, according to a rule, a size of a resource that is used for data transmission and that can be obtained by each logical channel. In this case, a data packet can be segmented on an RLC layer of each logical channel based on the obtained size of the resource, to better adapt the size of the resource. However, in this serial processing process, segmentation causes an additional delay.

In this application, the basic data unit is designed. Therefore, after the terminal reports the LCB BSR and before arrival of an uplink resource, RLC data packets having different sizes may be segmented, on the RLC layer based on the basic data unit size, into PDUs whose size is an integer multiple of the basic data unit size. A pre-segmentation function of the RLC layer may be configured by the base station. A configuration manner may be using RRC signaling or a MAC CE.

The RLC layer may alternatively be another protocol layer having a segmentation function.

In this way, the base station may learn of, based on the reporting of the LCB BSR by the terminal, a specific data of a data volume of LCB data to be transmitted by the terminal. After the uplink resource having a corresponding size is allocated to the terminal, and when the terminal receives the uplink resource, the terminal only needs to directly send the data packet by using the uplink resource because the terminal has segmented the data packet based on the basic data unit size in advance, and does not need to perform segmentation based on the resource size any more. In this way, a processing delay caused by segmentation is shortened.

6. Occupation of a Transmission Resource for the LCB Data

Usually, when there is LCB data to be sent, the terminal triggers reporting of an LCB BSR based on only a logical channel, and also receives an LCB UL grant sent by the base station for allocation of an uplink transmission resource only to the logical channel. Therefore, the LCB service data is transmitted by using an uplink resource indicated by the LCB UL grant. Common service data is not allowed to be transmitted by using the uplink resource of the LCB UL grant.

However, before receiving the LCB UL grant, the terminal receives a common UL grant sent by the base station for the common service data, and when determining that an uplink resource indicated by the common UL grant is greater than or equal to a data volume of the LCB service data to be transmitted, the terminal transmits the LCB service data on the uplink resource indicated by the common UL grant, to ensure that the LCB service data can be sent to the base station as quickly as possible. If the uplink resource indicated by the common UL grant is less than the data volume of the LCB service data to be transmitted, the terminal does not transmit the LCB service data on the uplink resource indicated by the common UL grant but waits for the uplink resource of the LCB UL grant, to avoid that the LCB service data cannot be sent at a time.

When receiving the common UL grant, the terminal may have triggered the reporting of the LCB BSR but does no send the LCB BSR. Therefore, the terminal may cancel sending the LCB BSR. Alternatively, the terminal may have sent the LCB BSR. Therefore, when receiving the uplink resource of the LCB UL grant sent by the base station, the terminal transmits the common service data by using the obtained resource of the LCB UL grant.

Figure 8:
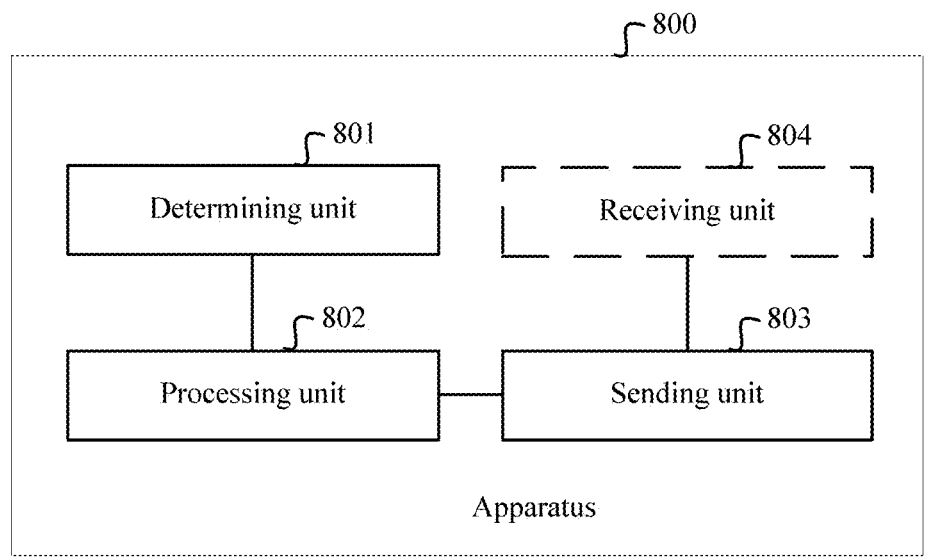
FIG. 8 is a first structural diagram of a BSR reporting apparatus according to an embodiment of this application.

Based on a same inventive concept, referring to FIG. 8, an embodiment of this application further provides a buffer status report reporting apparatus 800. The apparatus 800 has a function of implementing behavior of the terminal in the method shown in FIG. 3. The function may be implemented by hardware, or may be implemented by hardware executing corresponding software. The hardware or software includes one or more modules corresponding to the foregoing functions. A possible structure is shown in FIG. 8. The apparatus 800 includes a determining unit 801 and a processing unit 802.

The determining unit 801 is configured to determine a first logical channel used to transmit first-type service data. Data processing duration required by the first-type service data is less than a first specified threshold.

The processing unit 802 is configured to trigger a first buffer status report BSR based on the first logical channel when the determining unit 801 determines that the first-type service data that can be used to be sent exists on the first logical channel.

Optionally, the processing unit 802 is configured to determine, based on a correspondence between a service type and a basic data unit size, a first basic data unit size corresponding to a service type of the first-type service data, where the correspondence is preset or is indicated by a base station to the terminal, determine that a data volume of the first-type service data is N times the first basic data unit size, and add a value of N to the first BSR.

Optionally, the processing unit 802 is further configured to add, to the first BSR, first indication information used to indicate the service type of the first-type service data. The first indication information is used by the base station to determine the first basic data unit size.

Optionally, the processing unit 802 is further configured to pre-segment a protocol data unit PDU of the first-type service data on a segmentation layer after triggering the first BSR. A value of a data volume included in each segment is an integer multiple of the first basic data unit size, the segmentation layer is a protocol layer having a data segmentation function, and a pre-segmentation function of the terminal may be set to enabled or disabled.

Optionally, the processing unit 802 is further configured to add second indication information including a BSR type to the first BSR. The second indication information is used to instruct the base station to allocate a first uplink resource only to the first logical channel.

Optionally, the apparatus 800 further includes a sending unit 803, configured to, after the processing unit 802 triggers the first BSR based on the first logical channel, if an available uplink resource is sufficient to send the first BSR, send the first BSR to the base station, or if an available uplink resource is insufficient to send the first BSR, send the first BSR to the base station after reporting of a scheduling request SR is triggered. The SR is used to request, from the base station, an uplink resource used to send the first BSR, and the reporting of the SR is not limited by a logical channel SR-prohibit timer.

Optionally, the sending unit 803 is further configured to, after sending the first BSR to the base station, trigger a periodic BSR based on a specified period, and send the periodic BSR to the base station. The periodic BSR is periodically triggered by using the first-type service data.

Optionally, the apparatus 800 further includes a receiving unit 804, configured to, after the sending unit 803 sends the first BSR to the base station, receive, in specified duration, the first uplink resource allocated by the base station to the first logical channel. The sending unit 803 is further configured to send the first-type service data by using the first uplink resource, or resend the first BSR to the base station if the receiving unit 804 does not receive the first uplink resource in specified duration.

Optionally, the sending unit 803 is further configured to send a second BSR to the base station before sending the first BSR to the base station. The second BSR is used to indicate a value of a data volume of second-type service data to be sent. Data processing duration required by the second-type service data is greater than a second specified threshold, and the second specified threshold is greater than or equal to the first specified threshold.

The receiving unit 804 is further configured to receive a second uplink resource allocated by the base station based on the second BSR to a logical channel group including at least two second logical channels. The second logical channel is used to transmit the second-type service data, and a size of the second uplink resource is not less than the value of the data volume of the first-type service data to be sent.

The sending unit 803 is further configured to send the first-type service data by using the second uplink resource.

Optionally, the sending unit 803 is further configured to send the second-type service data by using the first uplink resource.

Optionally, a descending sequence of transmission priorities of the first BSR, the second BSR, the first-type service data, and the second-type service data is the first BSR, the first-type service data, the second BSR, and the second-type service data.

Figure 9:
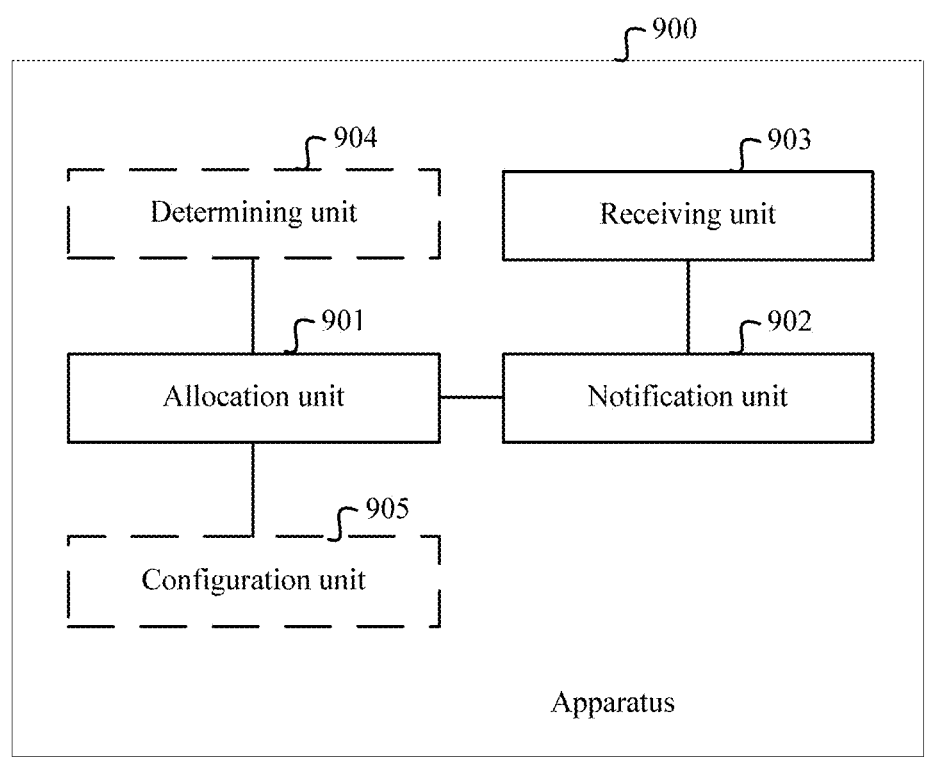
FIG. 9 is a second structural diagram of a BSR reporting apparatus according to an embodiment of this application.

Based on a same inventive concept, referring to FIG. 9, an embodiment of this application further provides a buffer status report reporting apparatus 900. The apparatus 900 has a function of implementing behavior of the base station in the method shown in FIG. 3. The function may be implemented by hardware, or may be implemented by hardware executing corresponding software. The hardware or software includes one or more modules corresponding to the foregoing functions. A possible structure is the apparatus 900 includes an allocation unit 901, a notification unit 902, and a receiving unit 903.

The allocation unit 901 is configured to allocate, to a terminal, a first logical channel used to transmit first-type service data.

The notification unit 902 is configured to notify the terminal of the first logical channel allocated by the allocation unit 901. Data processing duration required by the first-type service data is less than a first specified threshold.

The receiving unit 903 is configured to, after the terminal is notified of the first logical channel, receive a first buffer status report BSR sent by the terminal.

Optionally, the allocation unit 901 is further configured to allocate a first uplink resource to the first logical channel.

The notification unit 902 is further configured to send the first uplink resource to the terminal.

The receiving unit 903 is further configured to receive, on the first uplink resource, the first-type service data sent by the terminal.

Optionally, the allocation unit 901 is configured to determine a service type of the first-type service data according to first indication information carried in the first BSR, determine, based on a correspondence between a service type and a basic data unit size, a first basic data unit size corresponding to the service type of the first-type service data, and calculate a size of the first uplink resource based on a value of N carried in the first BSR and the determined first basic data unit size, and allocate the first uplink resource to the first logical channel. A data volume of the first-type service data is N times the first basic data unit size.

Optionally, the correspondence between the service type and the basic data unit size is preset.

Alternatively, the apparatus 900 further includes a determining unit 904, configured to determine, based on a parameter, a basic data unit size corresponding to each service type. The parameter includes radio link quality, system load, and a service type feature.

The notification unit 902 is further configured to indicate the correspondence between the service type and the basic data unit size to the terminal.

Optionally, the notification unit 902 indicates the correspondence to the terminal by using Radio Resource Control RRC signaling, a Media Access Control control element MAC CE, or a physical downlink control channel PDCCH order.

Optionally, the notification unit 902 is configured to configure, for the terminal by using RRC signaling, a parameter of the first logical channel used to transmit the first-type service data.

Optionally, the apparatus 900 further includes a configuration unit 905, configured to, before the receiving unit 903 receives the first BSR sent by the terminal, set a pre-segmentation function of the terminal to enabled, and instruct the terminal to pre-segment, after sending the first BSR and before receiving the first uplink resource, a protocol data unit PDU of the first-type service data on a segmentation layer. A value of a data volume included in each segment is an integer multiple of the first basic data unit size, and the segmentation layer is a protocol layer having a data segmentation function.

Figure 10:
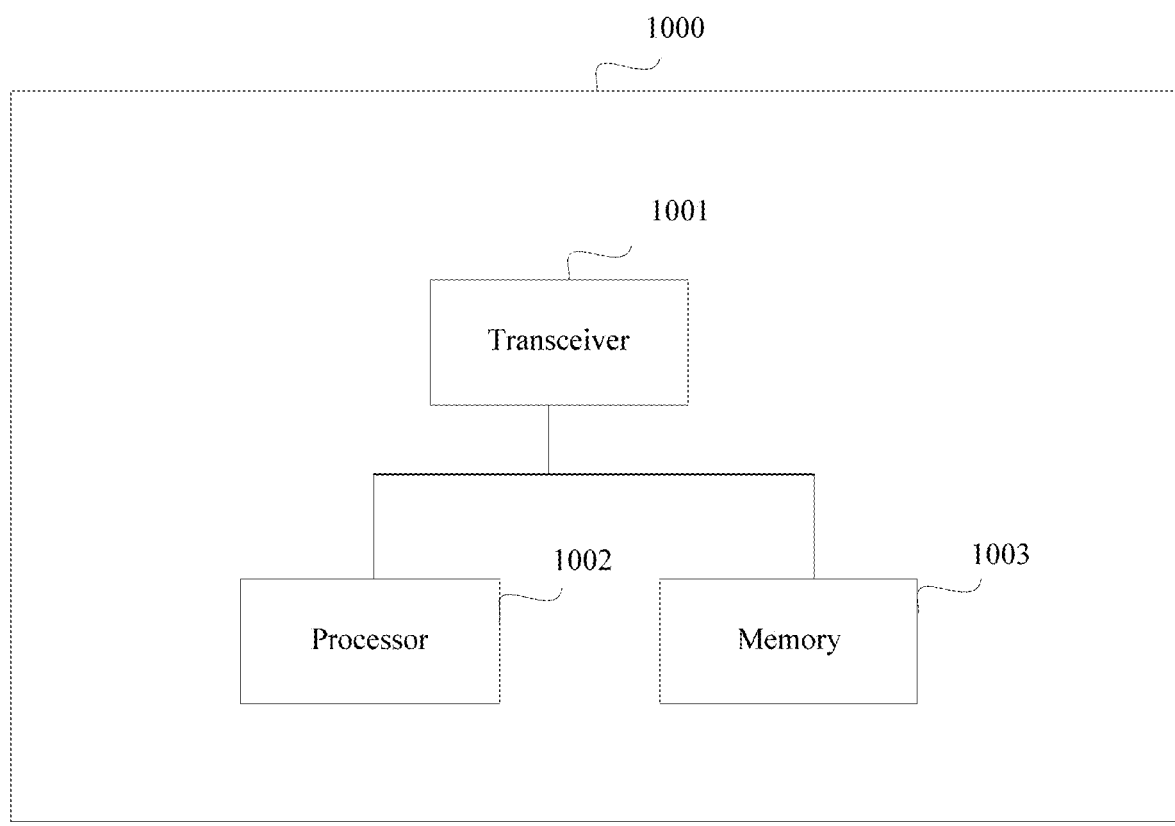
FIG. 10 is a schematic structural diagram of a terminal according to an embodiment of this application.

Based on a same inventive concept, referring to FIG. 10, an embodiment of this application further provides a terminal 1000. A structure of the terminal 1000 includes a transceiver 1001, a processor 1002, and a memory 1003. The memory 1003 is configured to store a group of programs. The processor 1002 is configured to invoke the programs stored in the memory 1003 to perform the method shown in FIG. 3.

In a possible design, the processor 1002 is configured to determine a first logical channel used to transmit first-type service data, where data processing duration required by the first-type service data is less than a first specified threshold, and trigger a first buffer status report BSR based on the first logical channel when determining that the first-type service data that can be used to be sent exists on the first logical channel. In this way, delayed transmission of service data having a high transmission latency requirement in a conventional manner of performing BSR reporting based on a logical channel group can be avoided, and processing duration of the type of service data is shortened to some extent, thereby improving processing efficiency of the type of service data.

In a possible design, the processor 1002 is configured to determine, based on a correspondence between a service type and a basic data unit size, a first basic data unit size corresponding to a service type of the first-type service data, where the correspondence is preset or is indicated by a base station to the terminal, determine that a data volume of the first-type service data is N times the first basic data unit size, and add a value of N to the first BSR. In this way, the terminal adds the value of N to the first BSR instead of adding a range of a value of a data volume of to-be-sent data to a BSR in a conventional manner, to clearly notify the base station of the value of the data volume of the to-be-sent data, and help the base station to allocate a precise first uplink resource. In addition, a resource occupied by carrying the value of the multiple N is smaller than that occupied by carrying a value of a data volume of to-be-transmitted data, to avoid an excessive resource occupied by the BSR, so that the precise value of the data volume can be accurately indicated, and the resource can be saved.

In a possible design, the processor 1002 is further configured to add, to the first BSR, first indication information used to indicate the service type of the first-type service data. The first indication information is used by the base station to determine the first basic data unit size. In this way, the base station can conveniently, accurately, and quickly determine the value of the data volume of to-be-transmitted data of the terminal.

In a possible design, the processor 1002 is further configured to pre-segment a protocol data unit PDU of the first-type service data on a segmentation layer after triggering the first BSR. A value of a data volume included in each segment is an integer multiple of the first basic data unit size, the segmentation layer is a protocol layer having a data segmentation function, and a pre-segmentation function of the terminal may be set to enabled or disabled. When the pre-segmentation function is set to enabled, the terminal can perform the pre-segmentation function. In this way, the PDU is pre-segmented, to avoid a higher delay caused by segmentation performed after the uplink resource allocated by the base station is received and shorten a data processing delay of the first-type service data to some extent.

In a possible design, the processor 1002 is further configured to receive RRC signaling or a MAC CE that is sent by the base station, to determine the pre-segmentation function allocated by the base station to the terminal.

In a possible design, the processor 1002 is further configured to add second indication information including a BSR type to the first BSR. The second indication information is used to instruct the base station to allocate a first uplink resource only to the first logical channel.

In a possible design, the processor 1002 is further configured to, after triggering the first BSR based on the first logical channel, if an available uplink resource is sufficient to send the first BSR, send the first BSR to the base station by using the transceiver 1001, or if an available uplink resource is insufficient to send the first BSR, send the first BSR to the base station by using the transceiver 1001 after triggering reporting of a scheduling request SR. The SR is used to request, from the base station, an uplink resource used to send the first BSR, and the reporting of the SR is not limited by a logical channel SR-prohibit timer. In this way, the data processing delay of the first-type service data can be further shortened.

In a possible design, the processor 1002 is further configured to, after sending the first BSR to the base station by using the transceiver 1001, trigger a periodic BSR based on a specified period, and send the periodic BSR to the base station by using the transceiver 1001. The periodic BSR is periodically triggered by using the first-type service data. In this way, the base station can learn of data sending of the terminal in time, and allocate the uplink resource to the terminal in time, to avoid a subsequent problem of insufficiency of a resource available to data when the terminal periodically sends data.

In a possible design, the processor 1002 is further configured to, after the transceiver 1001 sends the first BSR to the base station, receive, in specified duration by using the transceiver 1001, the first uplink resource allocated by the base station to the first logical channel. The processor 1002 is further configured to send the first-type service data by using the first uplink resource and the transceiver 1001, or resend the first BSR to the base station by using the transceiver 1001 if the transceiver 1001 does not receive the first uplink resource in specified duration. A problem that sending of the first-type service data is delayed due to that the terminal cannot receive the uplink resource when the terminal fails to send the first BSR to the base station or the base station fails to send the first uplink resource to the terminal is avoided, to ensure arrival of the resource for the first-type service data.

In a possible design, the processor 1002 is further configured to send a second BSR to the base station by using the transceiver 1001 before sending the first BSR to the base station by using the transceiver 1001. The second BSR is used to indicate a value of a data volume of second-type service data to be sent, data processing duration required by the second-type service data is greater than a second specified threshold, and the second specified threshold is greater than or equal to the first specified threshold. The processor 1002 is further configured to receive, by using the transceiver 1001, a second uplink resource allocated by the base station based on the second BSR to a logical channel group including at least two second logical channels. The second logical channel is used to transmit the second-type service data, and a size of the second uplink resource is not less than the value of the data volume of the first-type service data to be sent. The processor 1002 is further configured to send the first-type service data by using the second uplink resource and the transceiver 1001, thereby ensuring that the first-type service data is sent in time.

In a possible design, the processor 1002 is further configured to send the second-type service data by using the first uplink resource and the transceiver 1001.

In a possible design, a descending sequence of transmission priorities of the first BSR, the second BSR, the first-type service data, and the second-type service data is the first BSR, the first-type service data, the second BSR, and the second-type service data.

It should be noted that a connection manner between the parts shown in FIG. 10 is merely a possible example. The connection manner may alternatively be as follows. The transceiver 1001 and the memory 1003 are both connected to the processor 1002, and the transceiver 1001 is not connected to the memory 1003. Alternatively, another possible connection manner may be used. In FIG. 10, the processor 1002 may be a central processing unit (CPU for short), a network processor (NP), or a combination of a CPU and an NP.

The processor 1002 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 1003 may include a volatile memory, such as a random access memory (RAM). The memory 1003 may alternatively include a non-volatile memory, such as a flash memory, a hard disk (HDD), or a solid state disk (SSD). The memory 1003 may alternatively include a combination of the foregoing types of memories.

Figure 11:
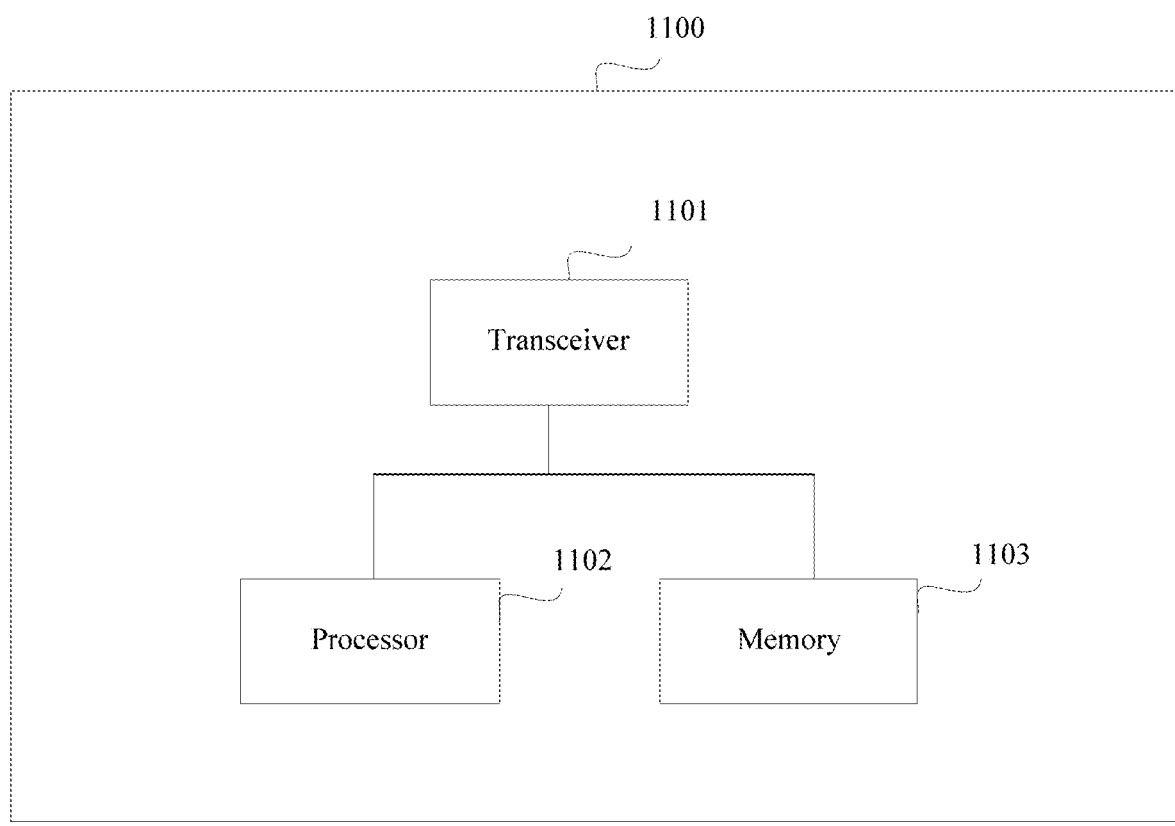
FIG. 11 is a schematic structural diagram of a base station according to an embodiment of this application.

Based on a same inventive concept, referring to FIG. 11, an embodiment of this application further provides a base station 1100. A structure of the base station 1100 includes a transceiver 1101, a processor 1102, and a memory 1103. The memory 1103 is configured to store a group of programs.

The processor 1102 is configured to invoke the programs stored in the memory 1103 to perform the method shown in FIG. 3.

In a possible design, the processor 1102 is configured to allocate, to a terminal, a first logical channel used to transmit first-type service data, notify the terminal of the first logical channel allocated by using the transceiver, where data processing duration required by the first-type service data is less than a first specified threshold, and after notifying the terminal of the first logical channel by using the transceiver 1101, receive a first buffer status report BSR sent by the terminal. In this way, delayed transmission of service data having a high transmission latency requirement in a conventional manner of performing BSR reporting based on a logical channel group can be avoided, and processing duration of the type of service data is shortened to some extent, thereby improving processing efficiency of the type of service data.

In a possible design, the processor 1102 is further configured to allocate a first uplink resource to the first logical channel, send the first uplink resource to the terminal by using the transceiver 1101, and receive, on the first uplink resource, the first-type service data sent by the terminal.

In a possible design, the processor 1102 is configured to determine a service type of the first-type service data according to first indication information carried in the first BSR, determine, based on a correspondence between a service type and a basic data unit size, a first basic data unit size corresponding to the service type of the first-type service data, and calculate a size of the first uplink resource based on a value of N carried in the first BSR and the determined first basic data unit size, and allocate the first uplink resource to the first logical channel. A data volume of the first-type service data is N times the first basic data unit size. In this way, the base station can accurately learn of, based on the value of N, a value of a to-be-sent data volume of the terminal, and precisely allocate the size of the uplink resource to the terminal.

In a possible design, the correspondence between the service type and the basic data unit size is preset. Alternatively, the processor 1102 is further configured to determine, based on a parameter, a basic data unit size corresponding to each service type, where the parameter includes radio link quality, system load, and a service type feature, and indicate the correspondence between the service type and the basic data unit size to the terminal. In this way, an appropriate correspondence between service types and basic data unit sizes can be indicated to the terminal with reference to the link quality.

In a possible design, the processor 1102 indicates the correspondence to the terminal by using the transceiver 1101 and Radio Resource Control (RRC) signaling, a Media Access Control control element (MAC CE), or a physical downlink control channel (PDCCH) order.

In a possible design, the processor 1102 is further configured to configure, for the terminal by using RRC signaling, a parameter of the first logical channel used to transmit the first-type service data.

In a possible design, the processor 1102 is further configured to, before the transceiver 1101 receives the first BSR sent by the terminal, configure a pre-segmentation function of the terminal to be enabled, and instruct the terminal to pre-segment, after sending the first BSR and before receiving the first uplink resource, a protocol data unit PDU of the first-type service data on a segmentation layer. A value of a data volume included in each segment is an integer multiple of the first basic data unit size, and the segmentation layer is a protocol layer having a data segmentation function.

In a possible design, the processor 1102 is specifically configured to notify the terminal of the pre-segmentation function by using RRC signaling or a MAC CE.

In a possible design, granularities of configuring the pre-segmentation function by the processor 1102 are different. The processor 1102 may configure the pre-segmentation function based on the logical channel or a radio bearer of the terminal. Alternatively, the processor 1102 may configure the pre-segmentation function based on the terminal.

In FIG. 11, the processor 1102 may be a central processing unit (CPU), a network processor (NP), or a combination of a CPU and an NP.

The processor 1102 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

It should be noted that a connection manner between the parts shown in FIG. 11 is merely a possible example. The connection manner may alternatively be as follows. The transceiver 1101 and the memory 1103 are both connected to the processor 1102, and the transceiver 1101 is not connected to the memory 1103. Alternatively, another possible connection manner may be used. The memory 1103 may include a volatile memory, such as a random access memory (RAM). The memory 1103 may alternatively include a non-volatile memory, such as a flash memory, a hard disk (HDD), or a solid state disk (SSD). The memory 1103 may alternatively include a combination of the foregoing types of memories.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the embodiments and all changes and modifications falling within the scope of this application.

Obviously, persons skilled in the art can make various modifications and variations to the embodiments of this application without departing from the spirit and scope of the embodiments of this application. This application is intended to cover these modifications and variations provided that they fall within the scope defined by the claims of this application and their equivalent technologies.

What is claimed is:

1. A buffer status report reporting method, comprising:
   determining, by a terminal, a first logical channel used to transmit first-type service data, wherein a data processing duration required by the first-type service data is less than a first specified threshold; and
   triggering, by the terminal, a first buffer status report (BSR) based on the first logical channel in response to determining that the first-type service data that can be used to be sent exists on the first logical channel, wherein the first BSR comprises data associated with a data volume of the first-type service data, and wherein the triggering the first BSR comprises:
      determining, by the terminal, according to a correspondence between a service type and a basic data unit size, a first basic data unit size corresponding to a service type of the first-type service data, wherein the correspondence between the service type and the basic data unit size is preset or is indicated by a base station to the terminal;
      determining, by the terminal, that a data volume of the first-type service data is N times the first basic data unit size, wherein N is a positive integer; and
      adding, by the terminal, a value of N to the first BSR.

2. The method according to claim 1, wherein the terminal further adds, to the first BSR, first indication information indicating the service type of the first-type service data, and wherein the first indication information is used by the base station to determine the first basic data unit size.

3. The method according to claim 1, wherein the method further comprises, performing, after the triggering the first BSR:
   pre-segmenting a protocol data unit (PDU) of the first-type service data on a segmentation layer, wherein a value of a data volume in each segment is an integer multiple of the first basic data unit size, wherein the segmentation layer is a protocol layer having a data segmentation function, and wherein a pre-segmentation function of the terminal can be set to enabled or disabled.

4. The method according to claim 1, wherein the terminal adds second indication information comprising a BSR type to the first BSR, and wherein the second indication information instructs the base station to allocate a first uplink resource only to the first logical channel.

5. The method according to claim 1, wherein the method further comprises performing, after the triggering, by the terminal, a first BSR based on the first logical channel, at least one of:
   sending, by the terminal, in response to an available uplink resource of the terminal being sufficient to send the first BSR, the first BSR to a base station; or
   sending, by the terminal, in response to an available uplink resource of the terminal being insufficient to send the first BSR, the first BSR to the base station after triggering reporting of a scheduling request SR, wherein the SR is used to request, from the base station, an uplink resource used to send the first BSR, and the reporting of the SR is not limited by a logical channel SR-prohibit timer.

6. The method according to claim 5, wherein the method further comprises performing, after the sending, by the terminal, the first BSR to the base station:
   triggering, by the terminal, a periodic BSR based on a specified period; and
   sending the periodic BSR to the base station, wherein the periodic BSR is periodically triggered by the first-type service data.

7. The method according to claim 5, wherein the method further comprises performing, after the sending, by the terminal, the first BSR to the base station, at least one of:
   receiving, by the terminal in specified duration, a first uplink resource allocated by the base station to the first logical channel, and sending the first-type service data using the first uplink resource; or
   resending, by the terminal, the first BSR to the base station in response to not receiving the first uplink resource in the specified duration.

8. The method according to claim 5, wherein the method further comprises performing, before the sending the first BSR to the base station:
   sending, by the terminal, a second BSR to the base station, wherein the second BSR indicates a value of a data volume of second-type service data to be sent by the terminal, wherein a data processing duration required by the second-type service data is greater than a second specified threshold, and wherein the second specified threshold is greater than or equal to the first specified threshold; and
   receiving, by the terminal, a second uplink resource allocated by the base station according to the second BSR to a logical channel group comprising at least two second logical channels, wherein the second logical channel is used to transmit the second-type service data, and wherein a size of the second uplink resource is not less than the value of the data volume of the first-type service data to be sent; and
   wherein the method further comprises:
      sending, by the terminal, the first-type service data using the second uplink resource.

9. A buffer status report reporting method, comprising:
   allocating, by a base station to a terminal, a first logical channel used to transmit first-type service data;
   notifying the terminal of the first logical channel, wherein data processing duration required by the first-type service data is less than a first specified threshold; and
   receiving, by the base station, a first buffer status report (BSR) sent by the terminal, wherein the first BSR comprises data associated with a data volume of the first-type service data, wherein the data associated with a data volume of the first-type service data comprises a value of N, wherein N is a positive integer indicating that the data volume of the first-type service data is N times a first basic data unit size, wherein the first basic data unit size corresponds to a service type of the first-type service data, and wherein a correspondence between the service type and the basic data unit size is preset or is indicated by the base station to the terminal.

10. The method according to claim 9, wherein the method further comprises performing, after the receiving the first BSR:
    allocating, by the base station, a first uplink resource to the first logical channel;
    sending the first uplink resource to the terminal; and
    receiving, by the base station on the first uplink resource, the first-type service data sent by the terminal.

11. The method according to claim 9, wherein the notifying the terminal of the first logical channel comprises:
    configuring, by the base station for the terminal by using radio resource control (RRC) signaling, a parameter of the first logical channel used to transmit the first-type service data.

12. A device, comprising:
    a processor; and
    a non-transitory computer-readable storage medium storing a program to be executed by the processor, the program including instructions to:
       determine a first logical channel used to transmit first-type service data, wherein data processing duration required by the first-type service data is less than a first specified threshold; and
       trigger a first buffer status report (BSR) based on the first logical channel in response to determining that the first-type service data that can be used to be sent exists on the first logical channel, wherein the first BSR comprises data associated with a data volume of the first-type service data, and wherein the instructions to trigger the first BSR include instructions to:
          determine, according to a correspondence between a service type and a basic data unit size, a first basic data unit size corresponding to a service type of the first-type service data, wherein the correspondence between the service type and the basic data unit size is preset or is indicated by a base station to the device;
          determine that a data volume of the first-type service data is N times the first basic data unit size, wherein N is a positive integer; and
          add a value of N to the first BSR.

13. The device according to claim 12, wherein the program further includes instructions to:
    add, to the first BSR, first indication information indicating the service type of the first-type service data, wherein the first indication information is used by the base station to determine the first basic data unit size.

14. The device according to claim 12, wherein the program further includes instructions to:
    pre-segment a protocol data unit (PDU) of the first-type service data on a segmentation layer, wherein a value of a data volume comprised in each segment is an integer multiple of the first basic data unit size, wherein the segmentation layer is a protocol layer having a data segmentation function, and wherein a pre-segmentation function can be set to enabled or disabled.

15. The device according to claim 12, wherein the program further includes instructions to:
add second indication information comprising a BSR type to the first BSR, wherein the second indication information instructs the base station to allocate a first uplink resource only to the first logical channel.

16. The device according to claim 12, wherein the program further includes instructions to perform at least one of:
send the first BSR to a base station in response to an available uplink resource being sufficient to send the first BSR; or
send the first BSR to the base station after triggering reporting of a scheduling request (SR) and in response to an available uplink resource being insufficient to send the first BSR, wherein the SR is used to request, from the base station, an uplink resource used to send the first BSR, and wherein the reporting of the SR is not limited by a logical channel SR-prohibit timer.

17. The device according to claim 16, wherein the program further includes instructions to:
trigger a periodic BSR based on a specified period; and
send the periodic BSR to the base station, wherein the periodic BSR is periodically triggered by the first-type service data.

18. The device according to claim 16, wherein the program further includes instructions to perform at least one of:
receive, in a specified duration, a first uplink resource allocated by the base station to the first logical channel, and sending the first-type service data by using the first uplink resource; or
resend the first BSR to the base station in response to not receiving the first uplink resource in the specified duration.

* * * * *